United States Patent [19]
Dewald, Jr. et al.

[11] Patent Number: 5,857,733
[45] Date of Patent: Jan. 12, 1999

[54] SYNCHRONIZATION DEVICE FOR A SLIDE OUT ROOM

[76] Inventors: James E. Dewald, Jr.; Martin P. McManus; Patrick W. McManus, all of 1023 W. Eighth St., P.O. Box 703, Mishawaka, Ind. 46544

[21] Appl. No.: 782,418

[22] Filed: Jan. 14, 1997

Related U.S. Application Data

[60] Provisional application No. 60/010,700 Jan. 29, 1996.
[51] Int. Cl. [6] ..................................................... B60P 3/34
[52] U.S. Cl. .......................................... 296/175; 296/171
[58] Field of Search .............................. 296/26, 165, 171, 296/172, 175, 26.1, 26.09, 26.13, 26.14

[56] References Cited

U.S. PATENT DOCUMENTS

| 5,570,924 | 11/1996 | Few et al. | 296/171 |
| 5,586,802 | 12/1996 | Dewald, Jr. et al. | 296/171 |
| 5,628,541 | 5/1997 | Gardner | 296/175 |

*Primary Examiner*—Jesus D. Sotelo
*Attorney, Agent, or Firm*—Baker & Daniels

[57] ABSTRACT

A synchronization device for use on recreational vehicles having slide out rooms that keeps the slide out room properly aligned with the frame of the recreational vehicle in order to ensure smooth operation. The device of the present invention includes a pair of elongated extensible members that connect the moveable frame to the fixed frame. Each of the members includes an inner end pivotally mounted to the fixed frame and an outer end pivotally mounted to the moveable frame, with the extensible members being shiftable between a folded, shortened position and an unfolded, extended position as the slide out room is extended. Each extensible member includes a hollow outer leg an extensible inner leg that is telescopically disposed within the outer leg. A pinion interconnects the extensible members and synchronizes the extension and retraction of the inner legs relative to the outer legs, and also synchronizes the folding or unfolding of the extensible members. Thus, the moveable frame remains parallel to and aligned with the fixed frame at all times.

30 Claims, 19 Drawing Sheets

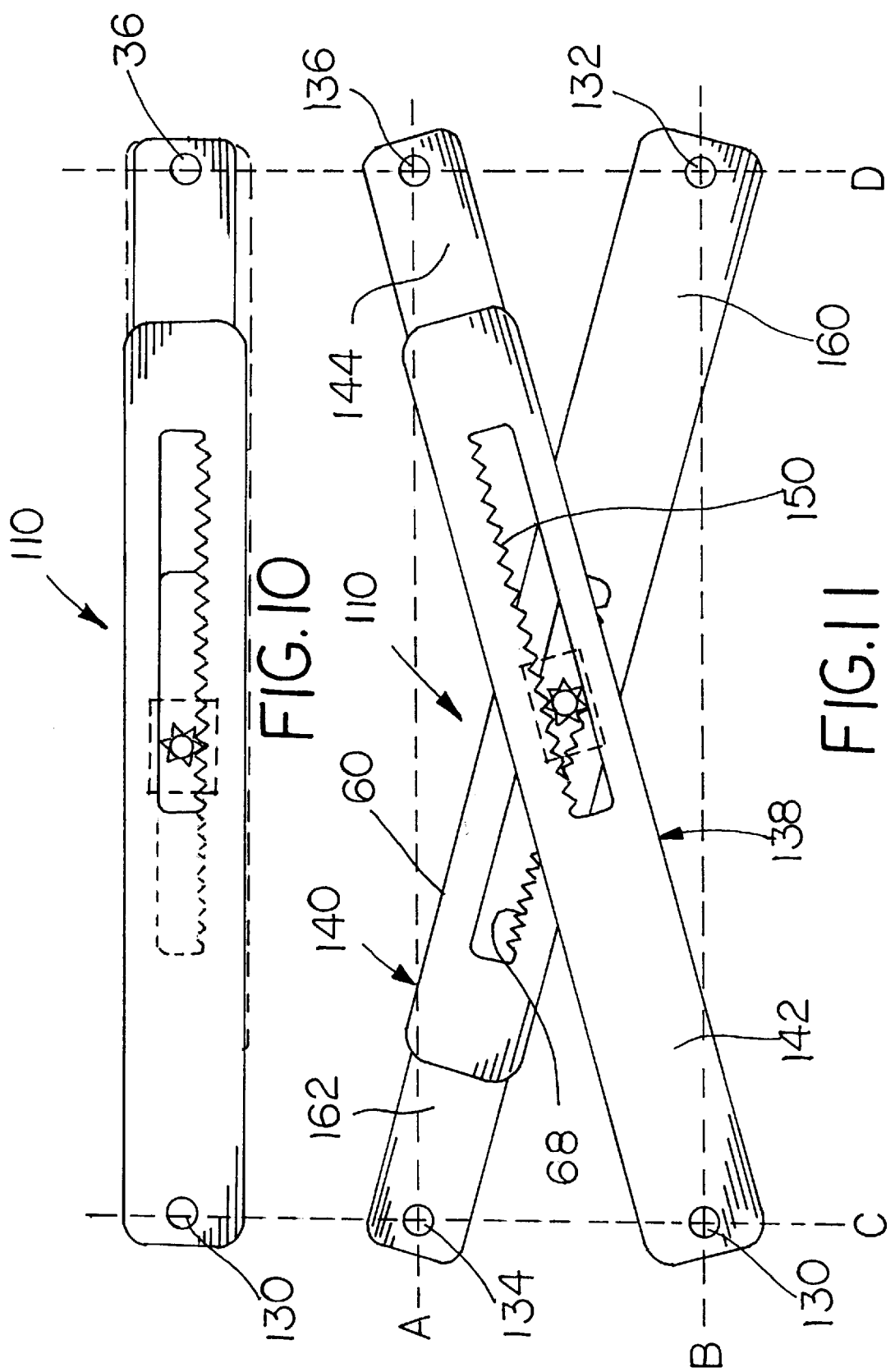

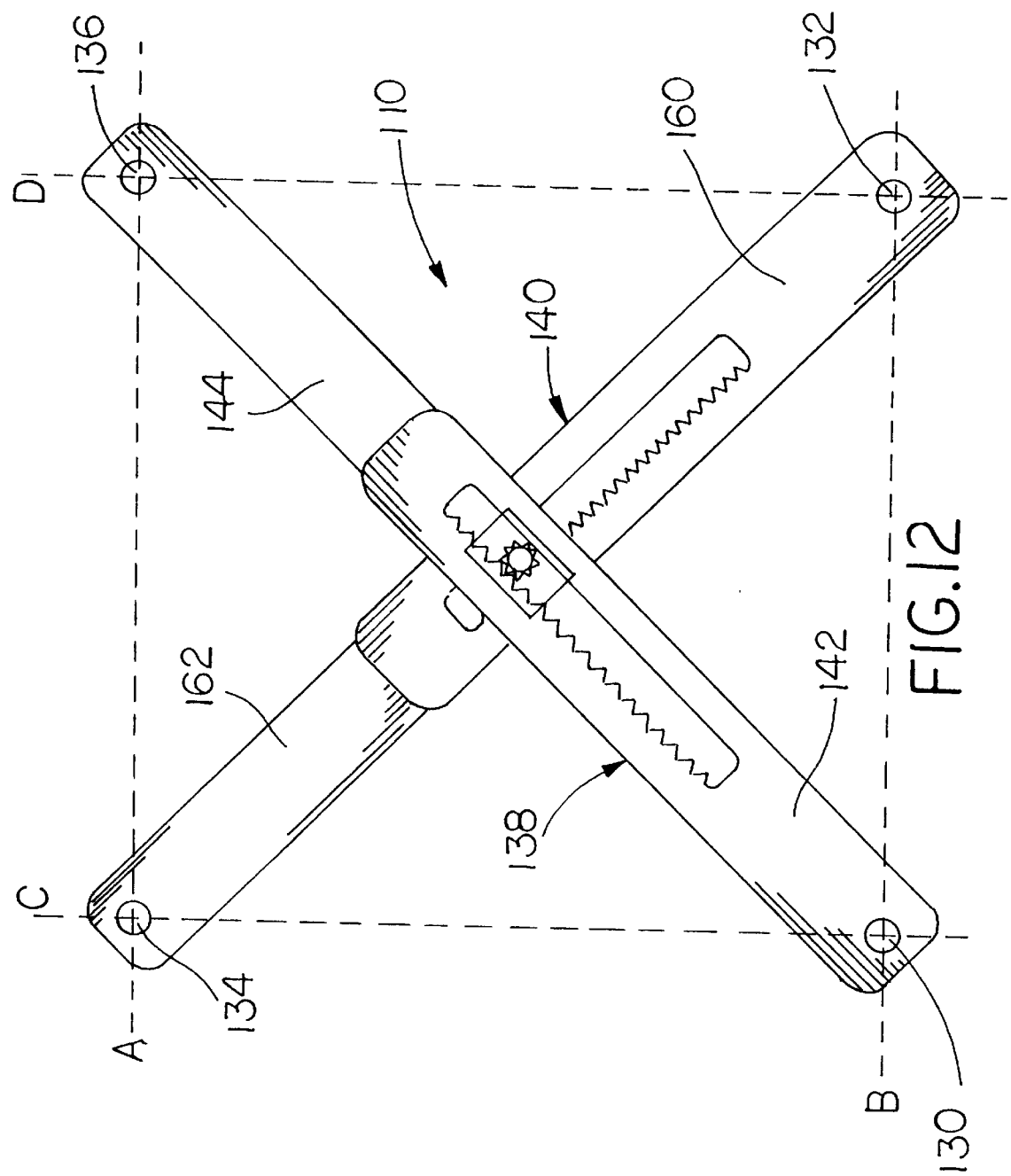

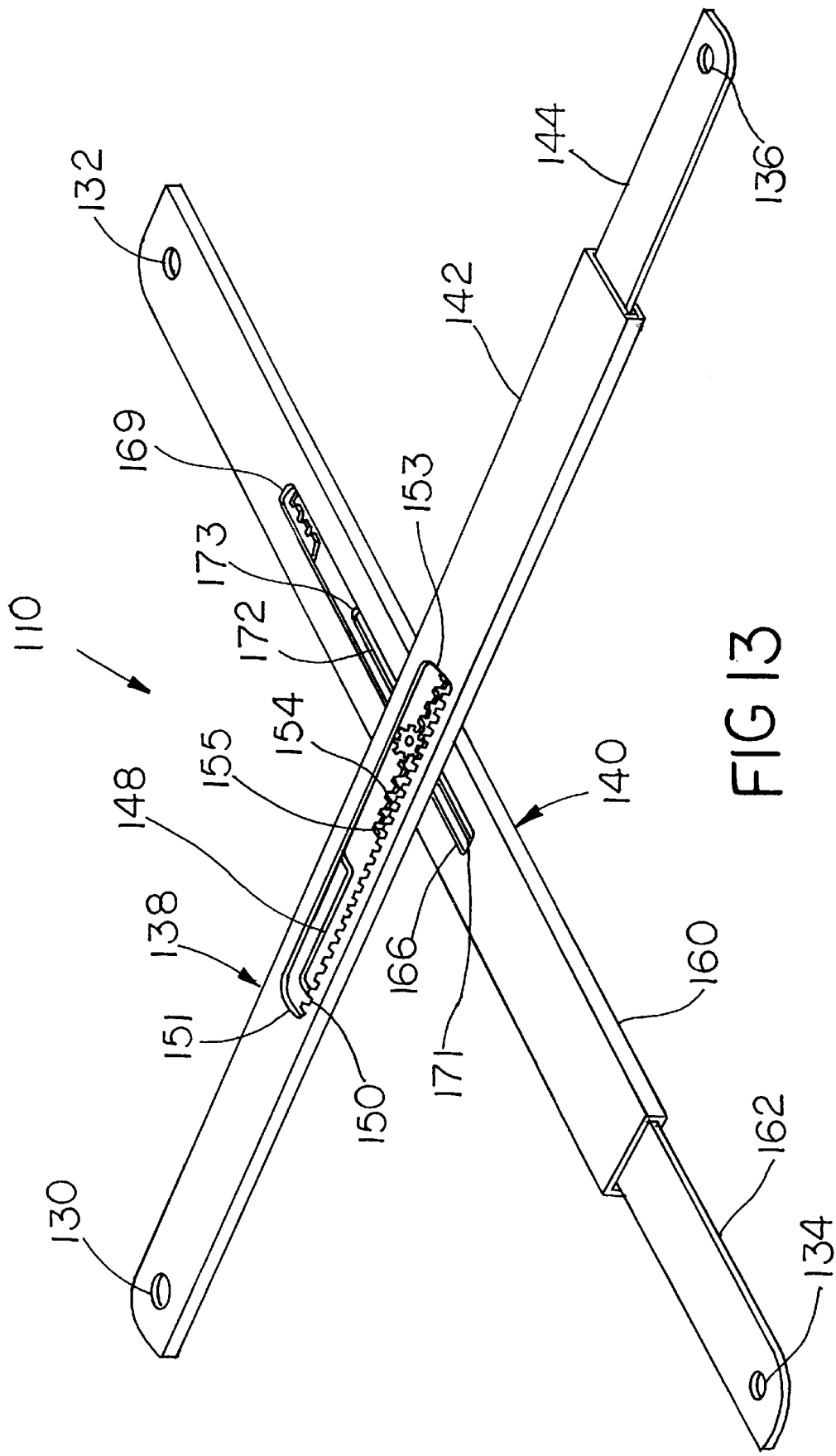

SYNCHRONIZATION DEVICE FOR A SLIDE OUT ROOM

This application claims domestic priority based on an earlier filed Provisional Patent Application Ser. No. 60/010, 700 Jan. 29, 1996. This invention relates to a mechanism for aligning, synchronizing, and stabilizing the action of moveable frames, such as frames used to support retractable slide out rooms on recreational vehicles.

BACKGROUND AND SUMMARY OF THE INVENTION

One common application of moveable frame assemblies is found on recreational vehicles and manufactured housing units. Because the maximum allowable width of recreational vehicles is limited by the width of the roads and highways, many recreational vehicles are equipped with one or more slide out rooms. These slide out rooms can be retracted into the main living quarters when the recreational vehicle is moved, and can then be extended from the main living quarters to provide auxiliary living space when the recreational vehicle is parked for use.

The moveable frames used to support these slide out rooms need to be kept in precise alignment relative to the fixed frame of the recreational vehicle in order to ensure that the moveable frame extends and retracts smoothly. Unfortunately, because slide out rooms are heavy and rather cumbersome, the rooms are liable to twist slightly as they are extended or retracted, which causes the room to bind or get stuck, thus damaging the room, the support system, or the hydraulic cylinders typically used to move the room. Therefore, in order to prevent these problems, either the forces used to extend or retract the slide out room must be equally applied to both sides of the frame, or the forces must be somehow synchronized so that both ends of the moveable frame move in tandem, such that the moveable frame remains parallel to and aligned with the fixed frame at all times.

A variety of synchronization and alignment systems have been used in the past, ranging from rack and pinion systems to cable and pulley arrangements. Each of the prior art alignment systems require a great deal of space underneath the vehicle, such as between the two main rails that form the frame of the vehicle. Unfortunately, the space between the main rails is typically occupied by storage tanks, heating ducts, plumbing, wiring, cross braces, and other obstructions. Furthermore, this space is frequently enclosed by an "underbelly" that protects the above items from dust, road grime, and the weather, and consequently the installation, adjustment, and maintenance of the alignment and synchronization systems is greatly impeded. Also, because the enclosed space sometimes is heated, systems that penetrate the space cause heat loss and provide an avenue for dust, dirt, and moisture to penetrate the protected area.

Some prior art systems use a pair of hydraulic cylinders to extend and retract the slide out room, which divides the force between two attachment points. However, a complex system of valves is required in order to ensure that the two cylinders extend and retract in unison. The use of two hydraulic cylinders and the need for valves to synchronize the cylinders greatly increases the installation and maintenance costs of such a system. Thus, the prior art alignment systems are expensive, difficult to fabricate and install, difficult to maintain, and prone to alignment and stability problems. Accordingly, there exists a need for an alignment mechanism that is more reliable and easier to install and maintain than are the systems referred to above.

The alignment and synchronization mechanism of the present invention is designed to alleviate the problems outlined above. The present invention utilizes two extensible members that are pivotally connected to each other in scissors type fashion, and which connect the moveable frame to the fixed frame. Each extensible member has a hollow outer leg and an extending inner leg that is telescopically disposed within the hollow outer leg when the moveable frame is in a folded or retracted position. The inner legs gradually extend out of their corresponding outer legs as the moveable frame is moved away from the fixed frame, which in effect lengthens each extensible member as the slide out room is extended and the moveable frame moves away from the fixed frame. The extension or retraction of the inner legs, as well as the unfolding or folding of the outer legs, are synchronized by a central pinion that connects the two extensible legs to each other. As the slide out room is extended, the pinion gradually feeds both inner legs out of their outer legs at the same rate. When the slide out room is retracted, the pinion ensures that the inner legs retract back into the outer legs at the same rate. The pinion engages a rack on each of the inner legs, and thus any movement of one inner leg produces a corresponding movement of the other inner leg. The pinion engages slots in the outer legs, which ensures that the outer legs fold and unfold at the same rate. Thus, as the extensible legs pivot towards or away from the fixed frame both legs are always at an equal angle relative to the fixed frame, which keeps the moveable frame parallel to the fixed frame at all times, and which prevents the moveable frame from moving forward or backward relative to the fixed frame. Furthermore, the synchronizing mechanism of the present invention operates independently of the system used to support the slide out room, and therefore the present invention can be used on any of the prior art room support systems.

The present invention is also much more stable than existing mechanisms such as the conventional scissors type mechanisms. On conventional scissors mechanisms having four attachment points, one of the attachment points on each of the fixed frame and the moveable frame must be slotted so that the attachment points can slide closer together as the frame is extended, which effectively makes the frame narrower and less rigid. By comparison, on the present invention all of the attachments are pin type connections, which are more precise and less prone to wear than are slotted connections. Also, by virtue of the extensible legs, the synchronizing mechanism of the present invention has a wide stance that does not narrow as the room is extended, and thus the slide out room is very stable in all positions.

Furthermore, because none of the attachment points on the present invention are slotted, the central pivot point on the synchronizing mechanism does not move forward or backward relative to the fixed frame as the room is extended or retracted. Accordingly, the hydraulic cylinder does not need to pivot relative to the frame but instead can be rigidly mounted to the fixed frame which reduces wear and tear. Finally, in one embodiment of the present invention a drive rack carried by the hydraulic cylinder connects directly to and drives the synchronizing pinion. By virtue of the extensible legs, the moveable frame thus travels further than the stroke of the piston, which allows the use of a smaller, more compact, and less expensive hydraulic cylinder.

Accordingly, it is an object of this invention to provide an improved synchronization mechanism for slide out rooms.

It is another object of this invention to provide a synchronization mechanism that equally divides the force used to extend and/or retract the slide out room between two attachment points.

It is another object of this invention to provide a synchronizing mechanism having extensible legs which are power driven by a short stroke hydraulic cylinder.

A further object of this invention is to provide a synchronization mechanism having a pair of extensible legs synchronized by a central pinion such that any movement of one leg produces a corresponding movement in the other leg.

These and other objects of the invention will become readily apparent to those skilled in the art upon a reading of the following description.

BRIEF DESCRIPTION OF THE DRAWINGS

FIG. 10 is a top plan view of a second embodiment of the present invention and showing the mechanism in its retracted position;

FIG. 11 is a top plan view similar to that shown in FIG. 10, but with the mechanism in a partially extended position;

FIG. 12 is a top plan view similar to that shown in FIGS. 10 and 11, but with the mechanism at or near the fully extended position;

FIG. 13 is a perspective view of the mechanism shown in FIGS. 10 through 12, shown at or near the fully extended position, but with the end caps removed to reveal the upper synchronizing gear;

DETAILED DESCRIPTION OF THE INVENTION

Figure 1:
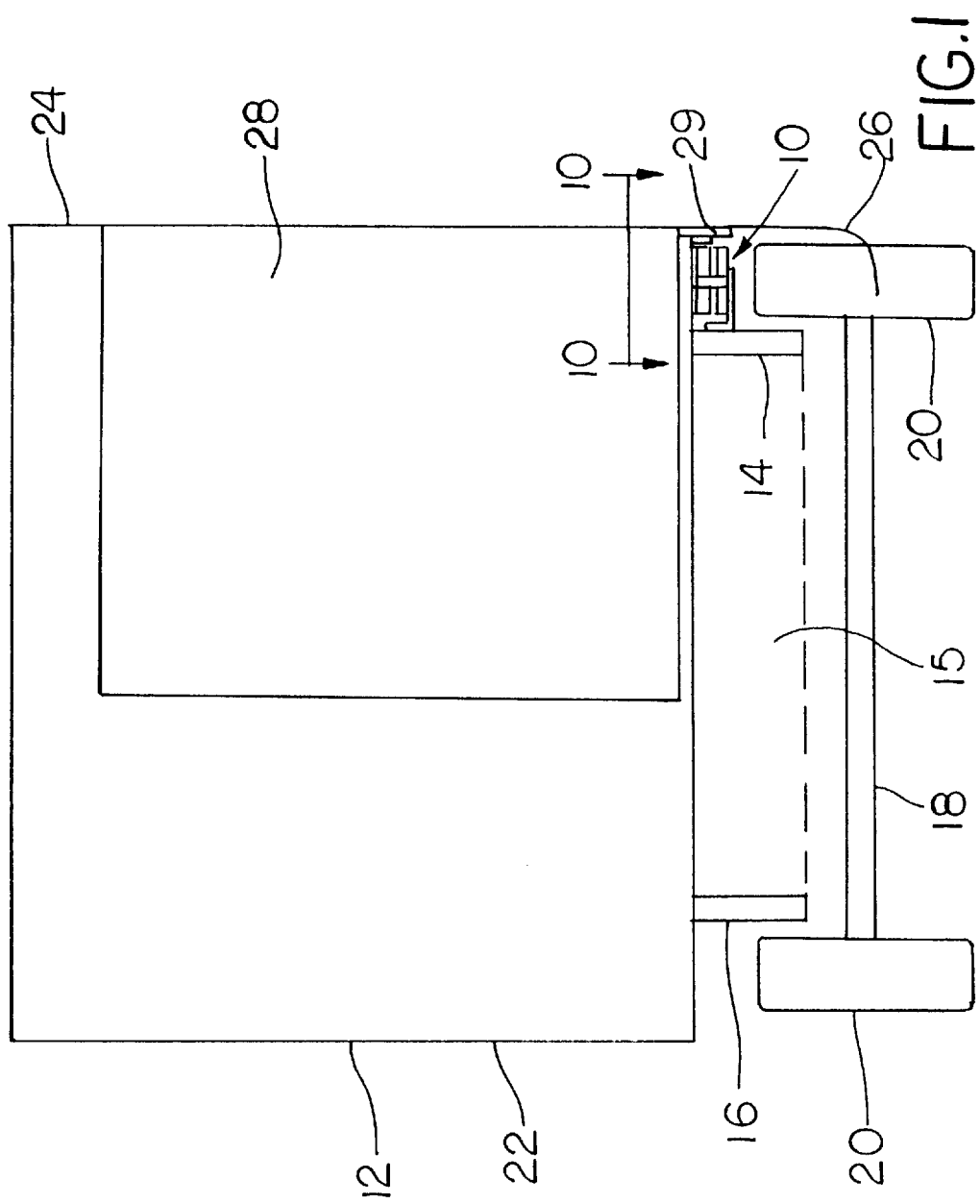
FIG. 1 is a cross sectional view of a recreational vehicle equipped with a slide out room incorporating the synchronization mechanism of the present invention shown disposed between the frame rail and the side wall of the vehicle.
Figure 2:
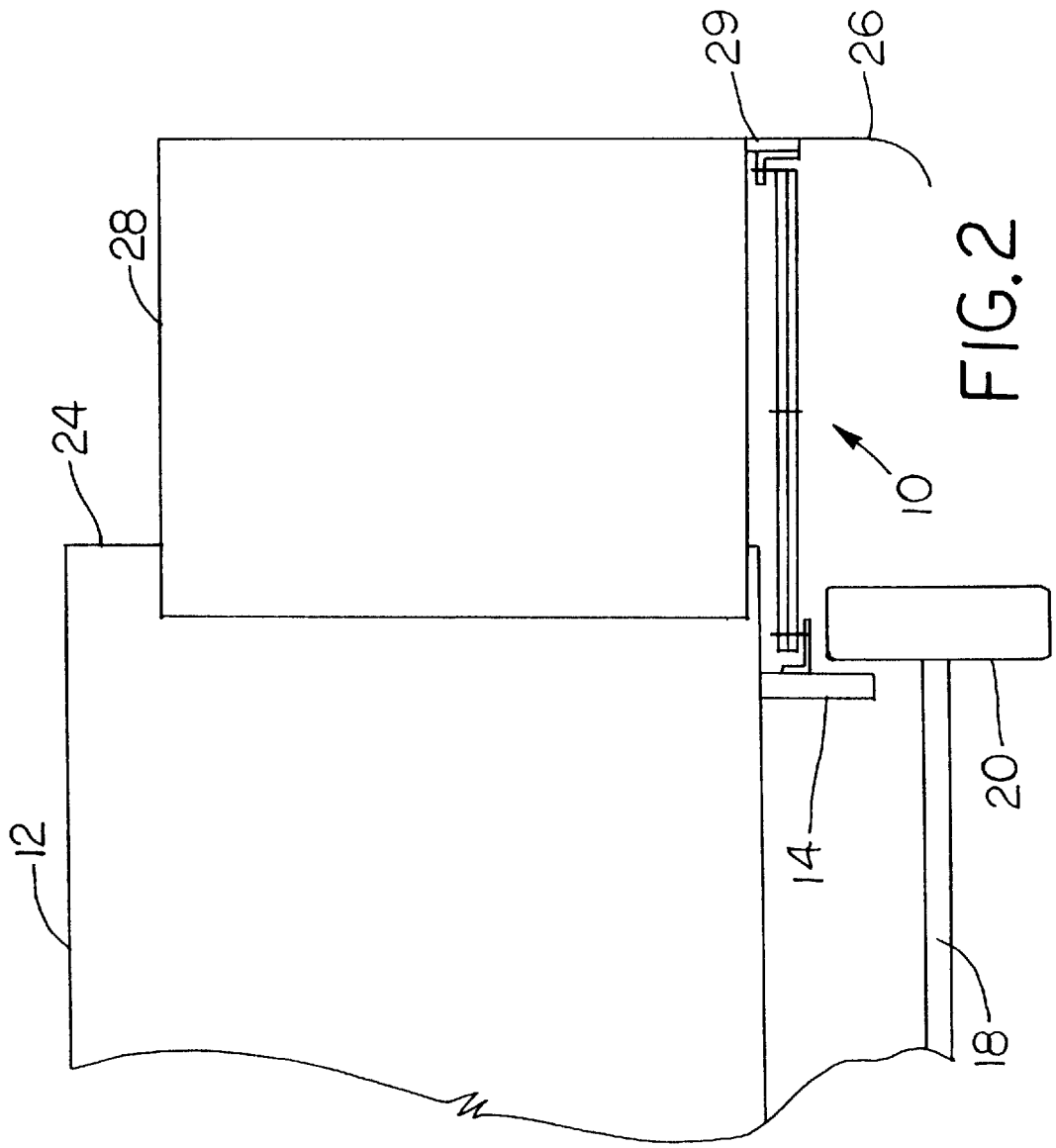
FIG. 2 is a fragmentary cross sectional view similar to FIG. 1 of a recreational vehicle equipped with a slide out room incorporating the synchronization mechanism of the present invention, but with the slide out room extended and the synchronizing mechanism in the unfolded position.

Referring now to the drawings, a synchronized folding frame mechanism incorporating the features of the present invention is generally indicated by the reference numeral 10 and is shown installed on a typical recreational vehicle 12. The vehicle 12 typically includes a pair of longitudinal fixed frame rails 14, 16, supported on axle 18 having wheels 20, and a pair of exterior side walls 22, 24. Sidewalls 22, 24 may include a lower extension or skirt 26 as is common in the industry. An enclosure or underbelly 15 lies between fixed rails 14, 16, and typically houses HVAC ducts, plumbing, wiring, and cross braces (not shown). The vehicle 12 further includes a slide out room 28, which is shiftable between the retracted position as shown in FIG. 1 and the extended position as shown in FIG. 2 in order to increase the available living space inside vehicle 12. Room 28 slides back and forth on a support system (not shown) as is common in the industry.

Rail 14 serves as a fixed frame member, and the attachment points 30, 32 of mechanism 10 are attached to the outboard side of rail 14 by mounting brackets (not shown), such as a conventional clevis type bracket. Room 28 includes a moveable frame member 29, and the outboard attachment points 34, 36 of mechanism 10 are attached to the inboard side of moveable frame member 29 by mounting brackets (not shown). Accordingly, mechanism 10 is entirely disposed between the outboard side of rail 14 and the inboard side of sidewall 24 when the room is in the retracted position. The attachment points 30, 32 of upper and lower members 38, 40 are pin type connections, and hence members 38 and 40 are free to pivot relative to fixed frame 14 as the upper and lower members begin to unfold. In a similar fashion, attachment points 34, 36 are also pin connections, and hence members 38, 40 are free to pivot relative to moveable frame 29. One of the mounting brackets may include an adjustment mechanism (not shown) to permit small adjustments to the attachment points in order to compensate for minor irregularities in frame rail 14 and/or moveable member 29.

Figure 3:
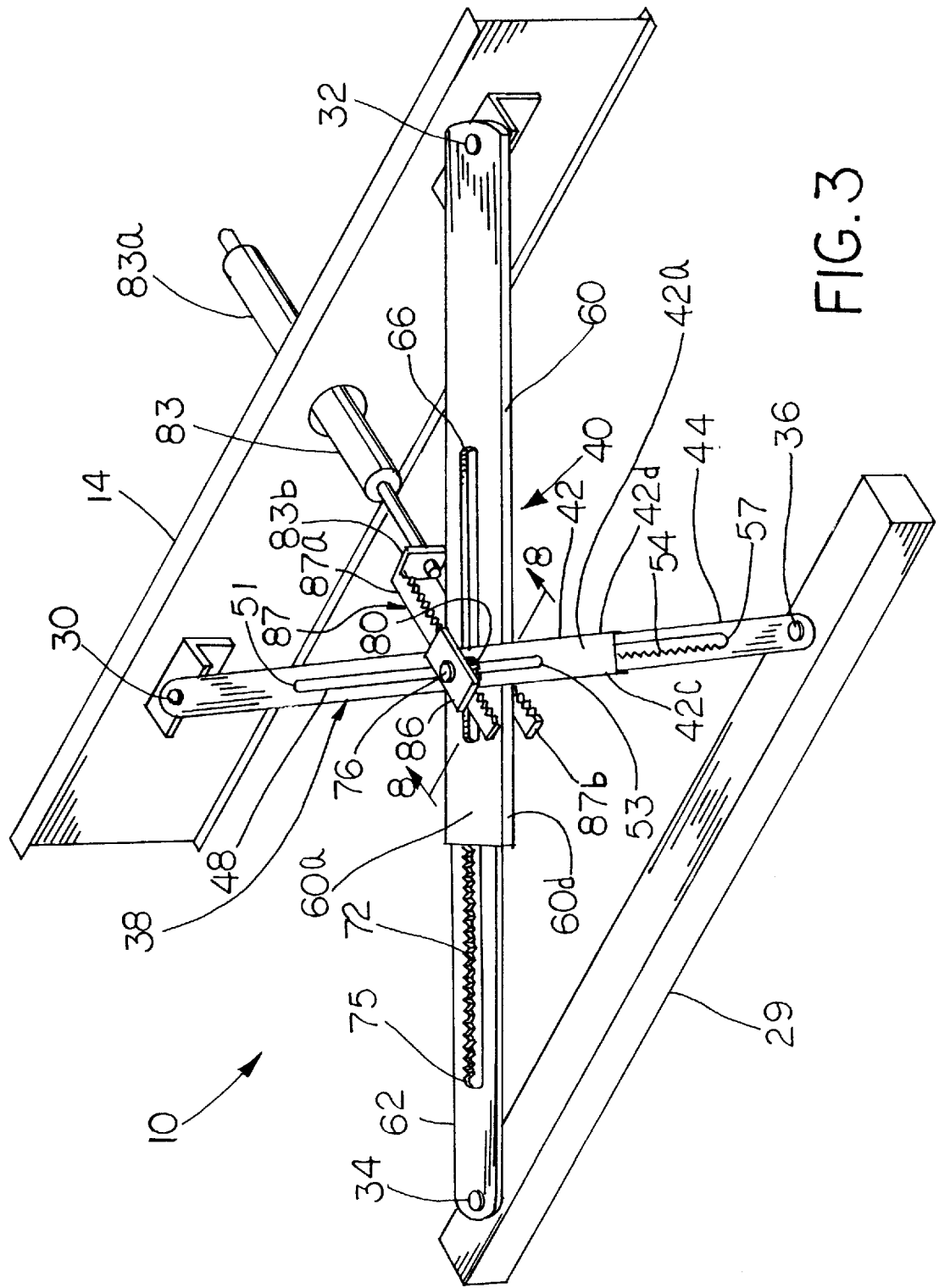
FIG. 3 is a perspective view showing the synchronizing mechanism of the present invention shown connecting the moveable frame to the fixed frame, with the mechanism shown at or near the fully extended position.

As shown in FIGS. 4 through 8, mechanism 10 includes upper and lower longitudinally extensible members 38, 40. Upper member 38 includes substantially hollow outer leg 42 having top surface 42a, bottom surface 42b, and a pair of side surfaces 42c and 42d which define longitudinal cavity 43. Inner leg 44 is reciprocally disposed within the cavity 43 of outer leg 42. Outer leg 42 includes an upper slot 48 in top surface 42a and a lower slot 50 in bottom surface 42b. Slots 48, 50 include a first end 51 and a second end 53. Inner leg 44 also includes a rack or toothed slot 54, and slot 54 includes a first end 55 and second end 57. In a similar fashion, lower member 40 includes substantially hollow outer leg 60 having top surface 60a, bottom surface 60b, and a pair of side surfaces 60c and 60d which define longitudinal cavity 63. Inner leg 62 is reciprocally disposed within cavity 63 of outer leg 60. Outer leg 60 includes an upper slot 66 in top surface 60a and a lower slot 68 in bottom surface 60b. Slots 66 and 68 include a first end 69 and a second end 71. Inner leg 62 also includes a toothed slot 72 having a first and second end 73, 75. As can be seen in FIG. 3, as the moveable frame 29 approaches the fixed frame 14, the teeth on slots 54 and 72 of inner members 44 and 62, respectively, are oriented in different directions. With the moveable frame 29 located near fixed frame 14, the teeth on slot 54 point outwardly towards the moveable frame 29, while the teeth on slot 72 point inwardly towards fixed frame 14.

Figure 4:
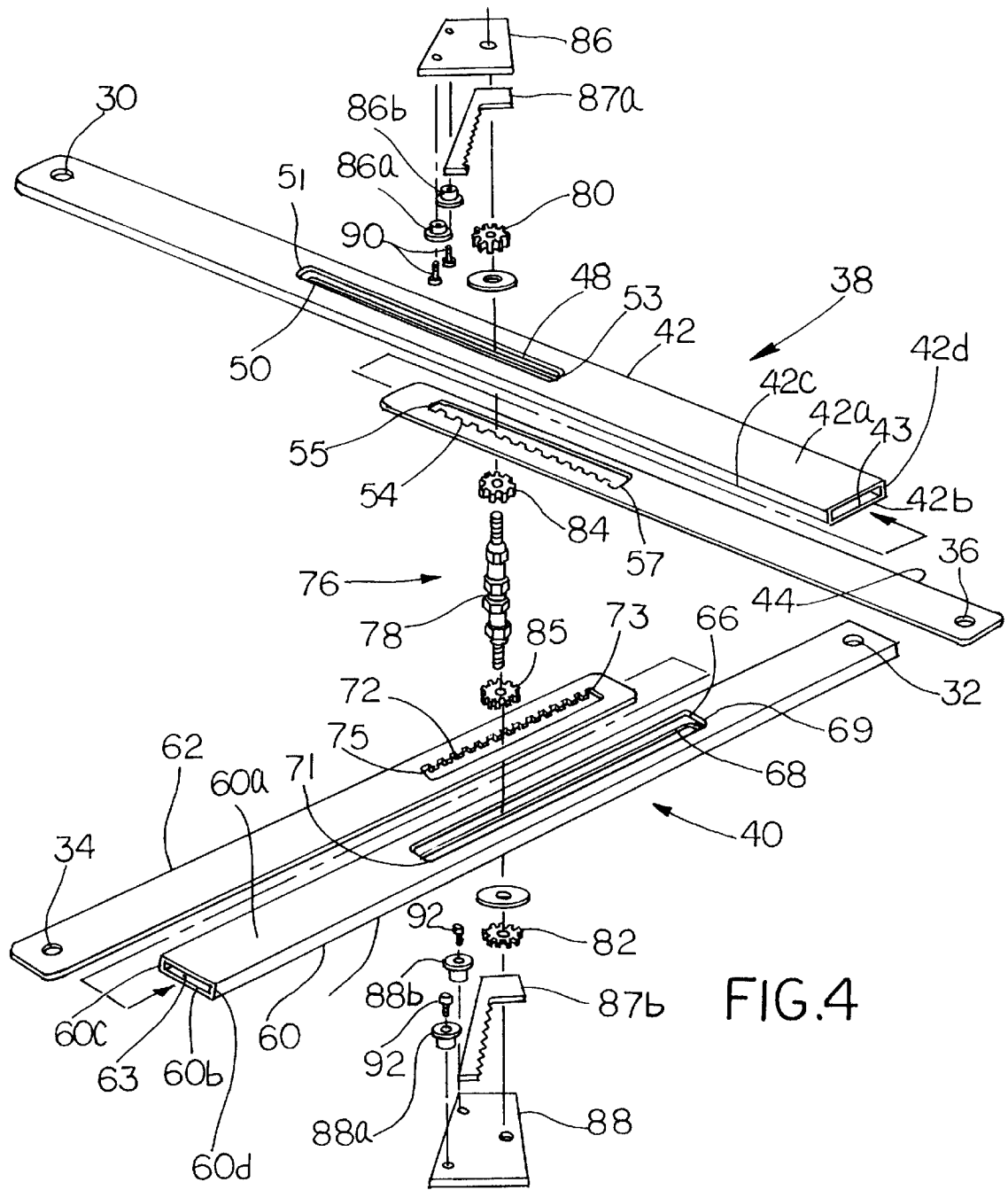
FIG. 4 is an exploded view in perspective of the synchronizing mechanism shown in FIG. 3.
Figure 8:
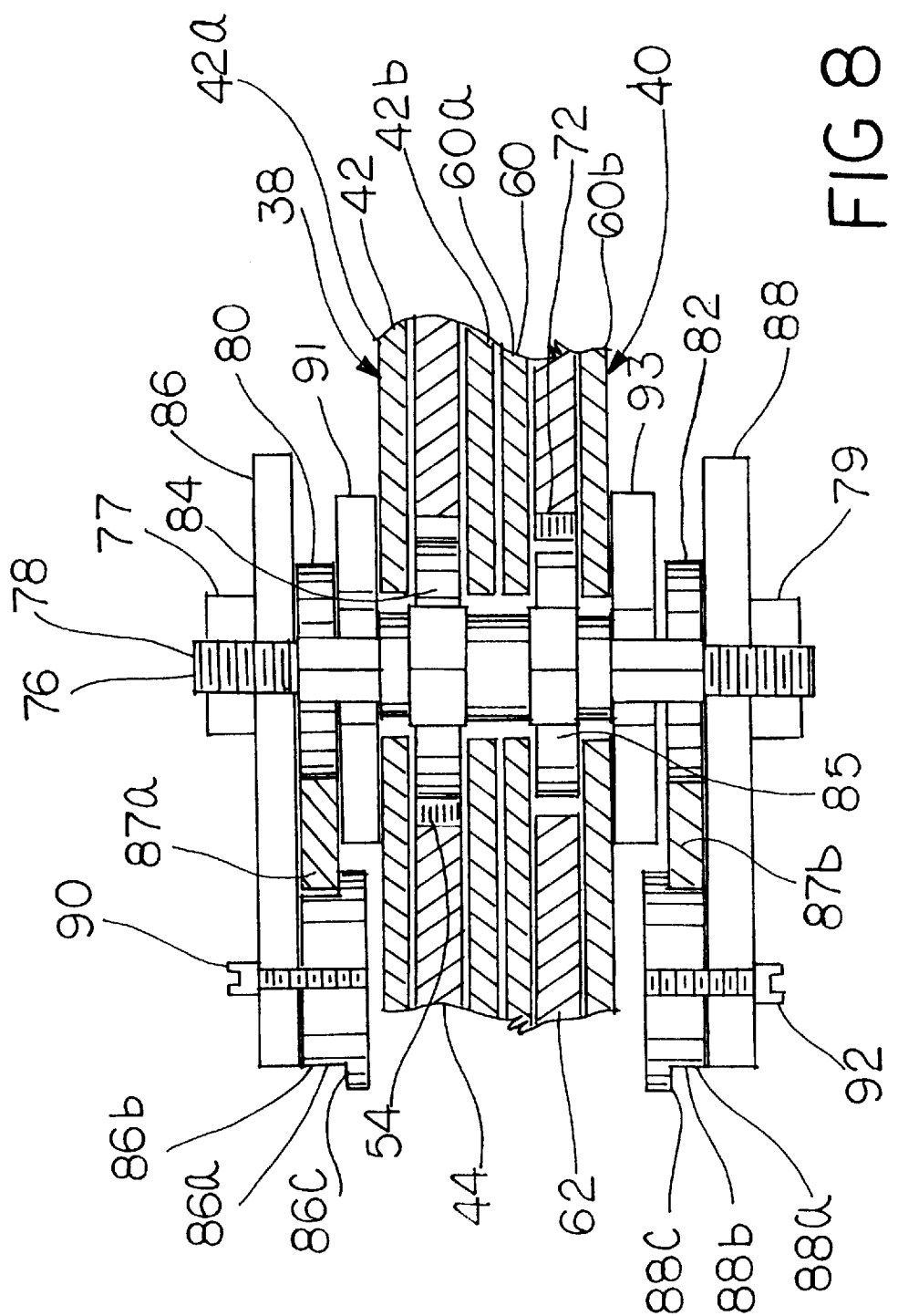
FIG. 8 is an enlarged view in section taken substantially along lines 8—8 of FIG. 3, showing the synchronizing pinion engaging the inner and outer legs and the power drive rack engaging the drive gears.
Figure 9:
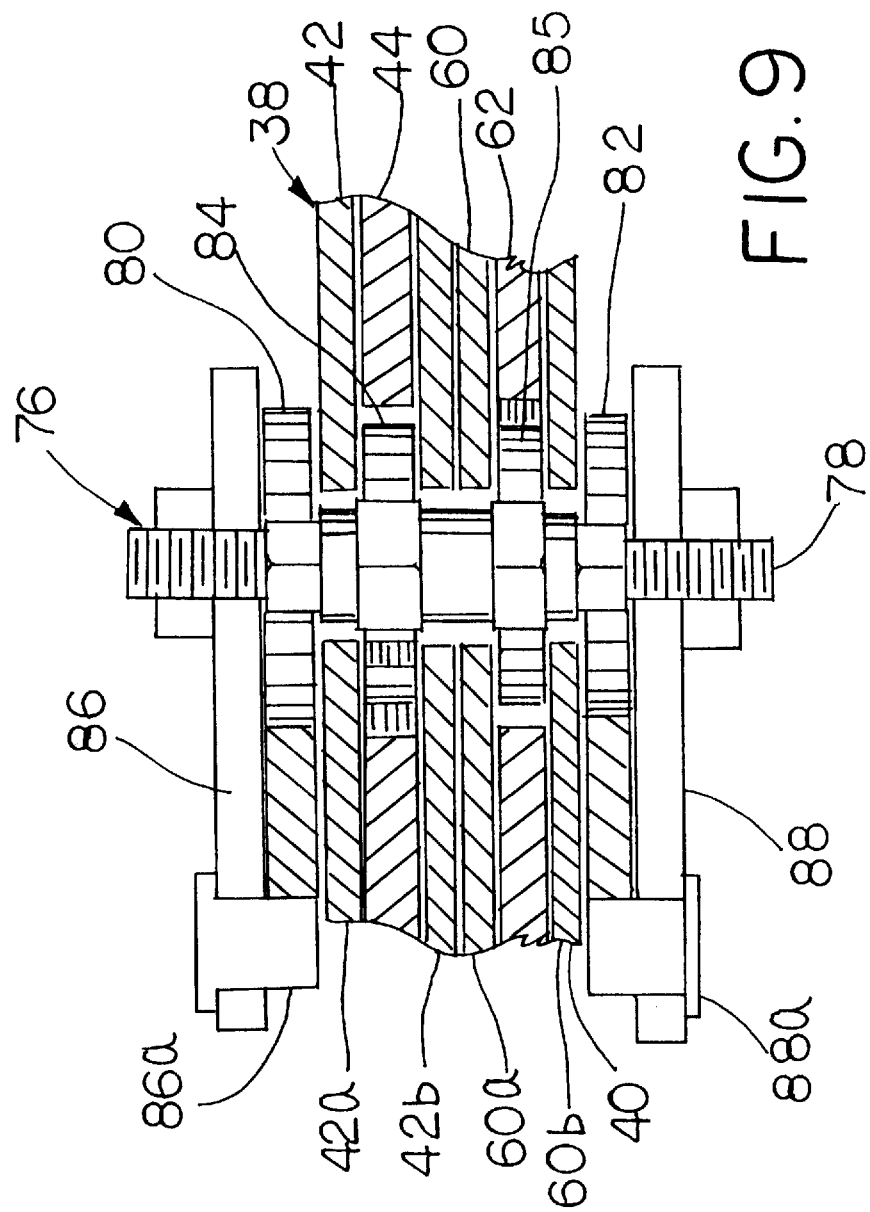
FIG. 9 is an enlarged view in section similar to that shown in FIG. 8, but showing an alternate embodiment in which the spacers between the drive gears and the outer members have been eliminated.
Figure 14:
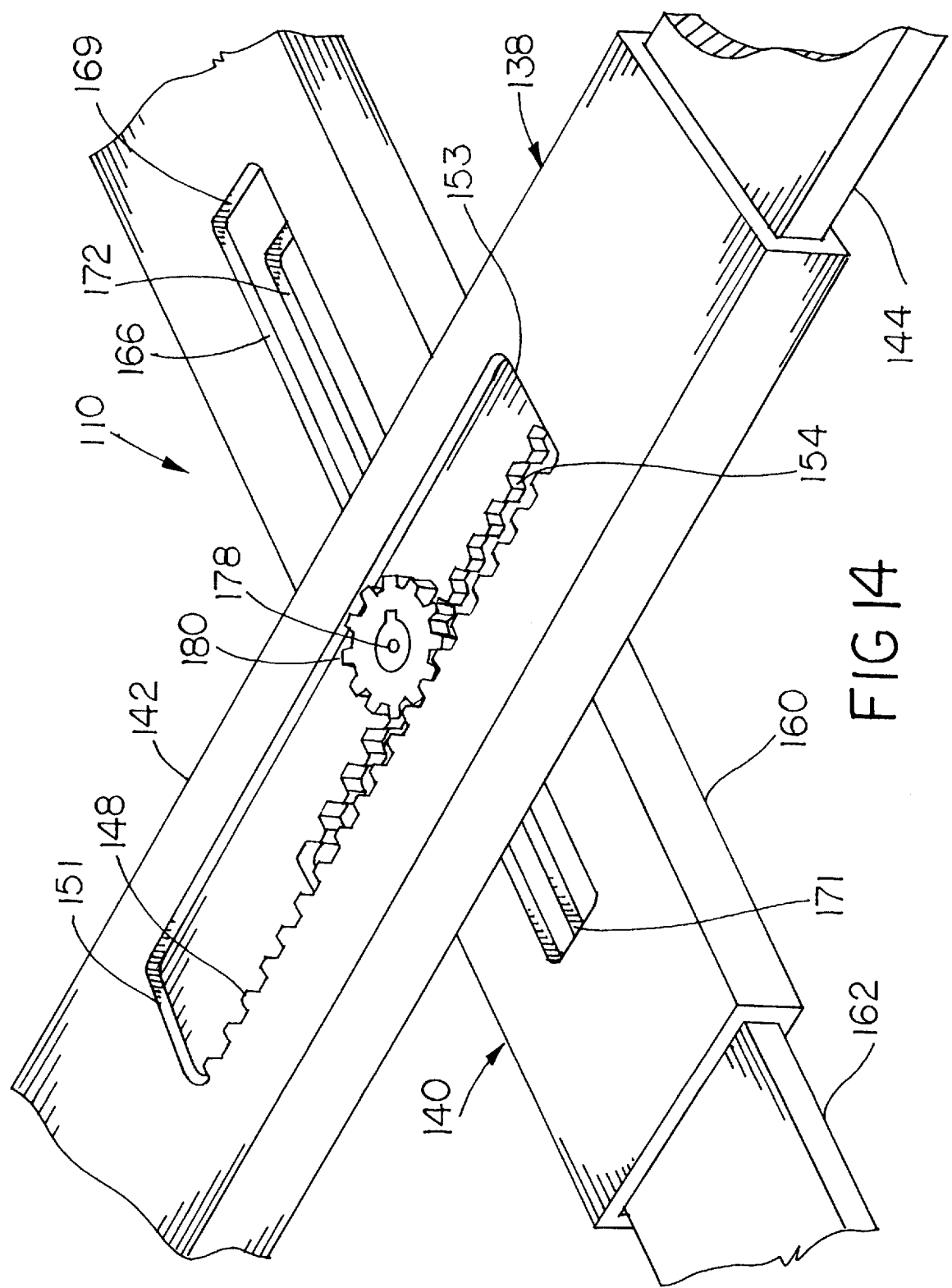
FIG. 14 is an enlarged fragmentary view in perspective of the embodiment shown in FIGS. 10 through 13 showing the intersection of the two main members.
Figure 15:
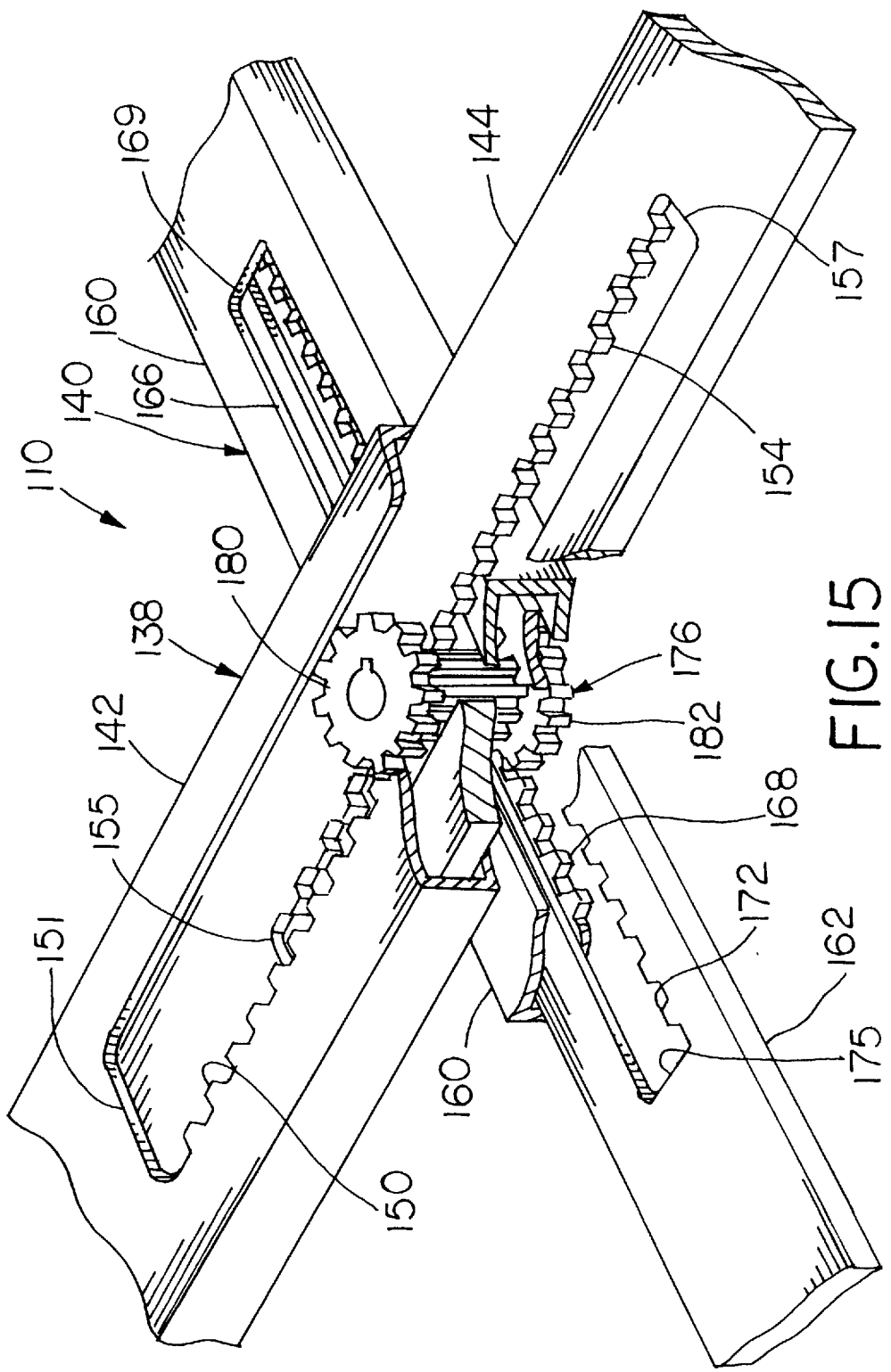
FIG. 15 is an enlarged fragmentary view in perspective similar to that shown in FIG. 14, but with portions of the members cut away to reveal the synchronizing gears.
Figure 16:
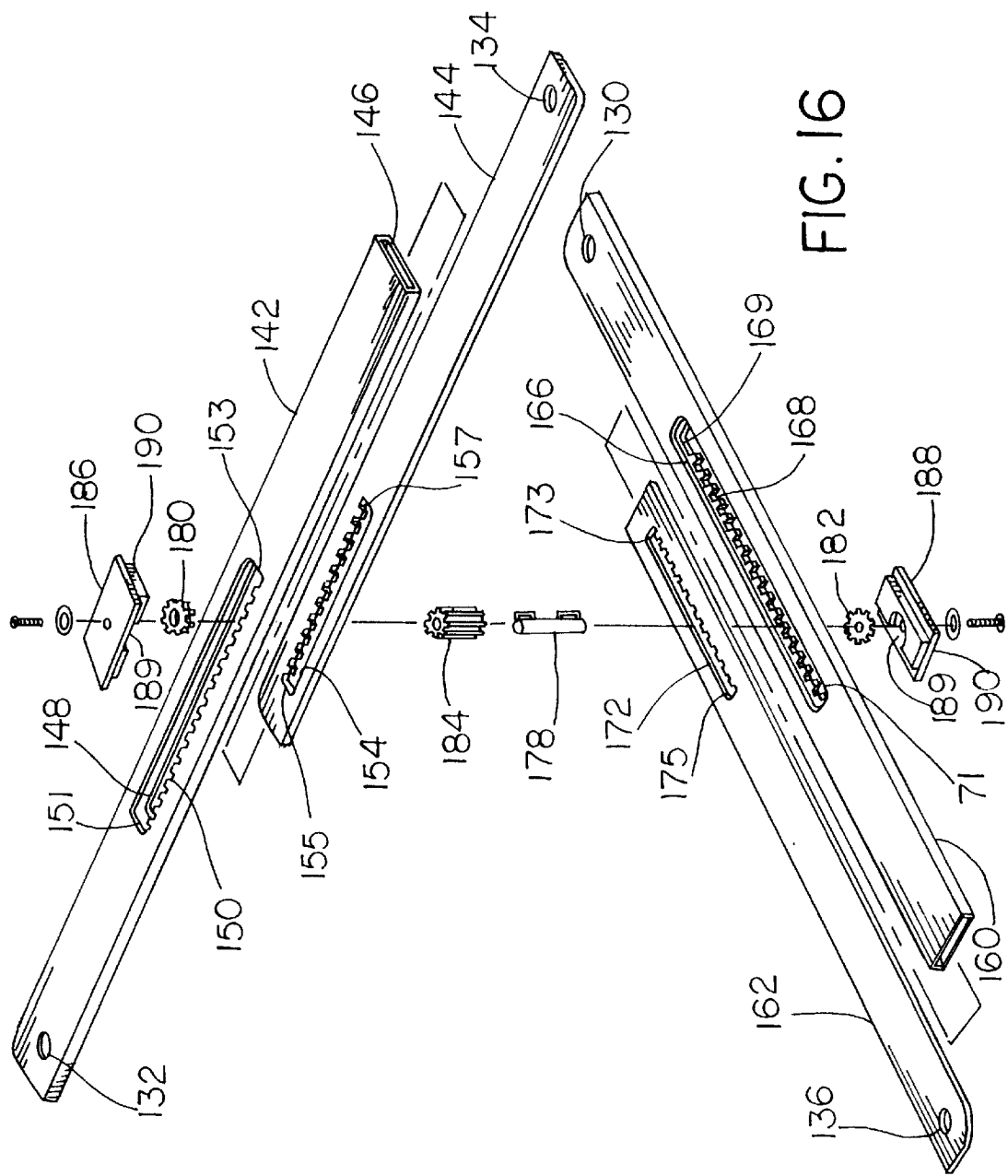
FIG. 16 is an exploded view in perspective of the mechanism as shown in FIGS. 13 through 15.
Figure 17:
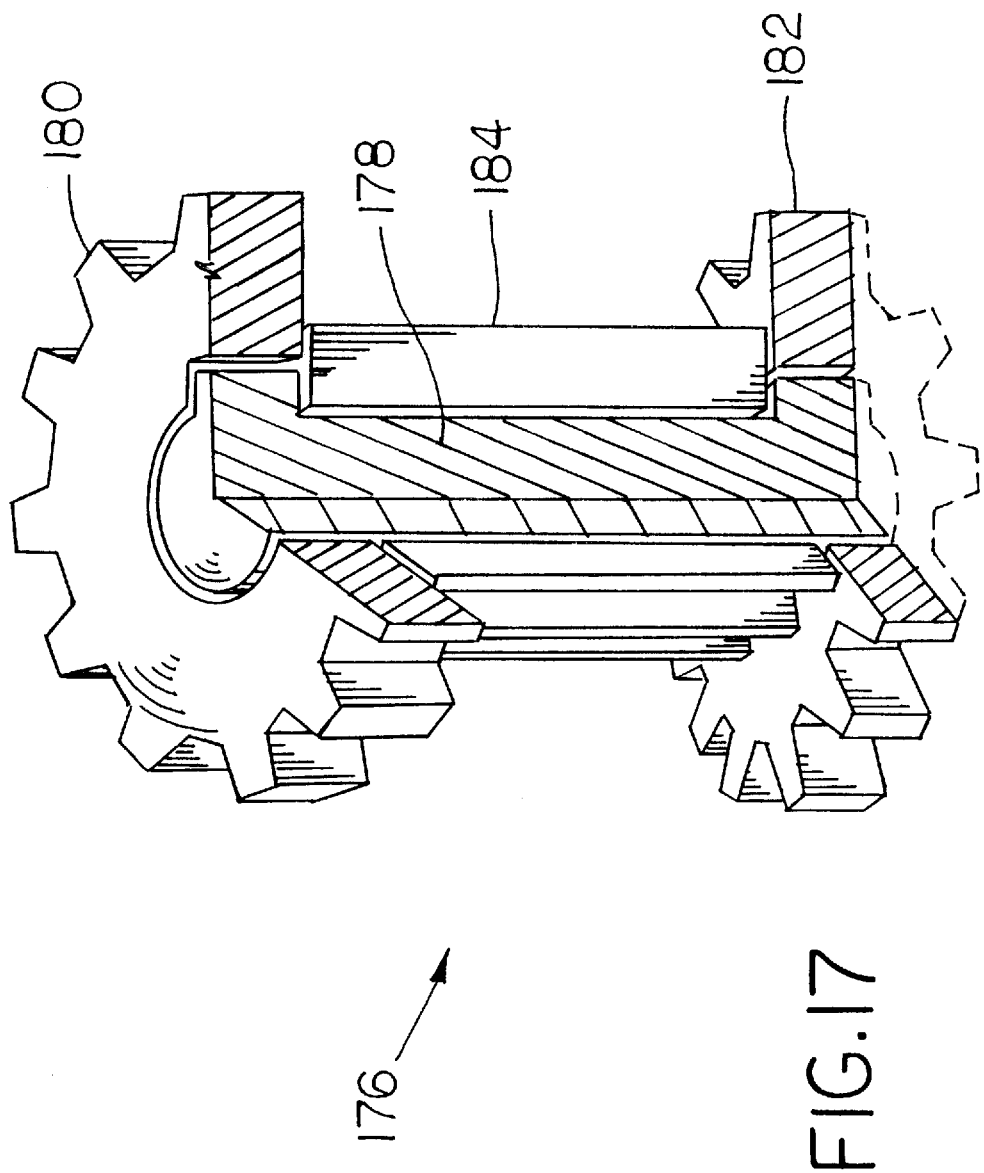
FIG. 17 is an enlarged perspective view, partly in section, of the synchronizing pinion used in the embodiment of FIGS. 13 through 16.

As shown in FIGS. 4 through 8, synchronizing pinion 76 includes shaft 78, upper and lower drive gears 80, 82, and upper and lower synchronizing gears 84, 85. Gears 80, 82, 84 and 85 are welded, keyed, bolted, splined, or otherwise suitably attached to shaft 78 so that all of the gears rotate in tandem in conjunction with any rotation of the shaft 78. Hydraulic cylinder 83 includes inner end 83a secured to frame 12 and outer end 83b connected to pinion 76. Cylinder 83 includes drive rack 87 and upper and lower toothed racks 87a and 87b which are secured to pinion 76 by upper and lower caps 86, 88. Pinion 76 includes upper and lower threaded retention nuts 77, 79, which secure upper and lower caps 86, 88 to the pinion 76 at the intersection of members 38, 40. End cap 86 includes a pair of upper captivating bearings 86a, 86b, each of which includes a ledge portion 86c, while end cap 88 includes lower captivating bearings 88a, 88b, each of which includes a ledge portion 88c. Upper washer 91 is situated between upper drive gear 80 and upper member 38, while a lower washer 93 is situated between lower drive gear 82 and lower member 40. Ledge 86c of upper captivating bearings 86a and 86b along with washer 91 maintain upper drive rack 87a in contact with upper drive gear 80, while ledge 88c of lower captivating bearings 88a, 88b maintain lower drive rack 87b in contact with lower drive gear 82. Upper bearings 86a, 86b are secured to upper cap 86 by a plurality of screws or bolts 90. Similarly, lower bearings 88a, 88b are secured to lower cap 88 by a plurality of screws or bolts 92. As can be seen in FIGS. 4 and 8, pinion 76 is disposed so that shaft 78 extends through slots 48, 54, 50, 66, 72 and 68, respectively, such that upper synchro gear 84 meshes with the rack 54 of upper member 38 and lower synchro gear 85 meshes with rack 72 of lower member 40. End caps 86, 88 maintain pinion 76 in precise alignment substantially perpendicular to upper and lower members 38, 40. Any movement of cylinder 83 causes drive racks 87a and 87b to mesh with upper and lower drive gears 80, 82, which rotates pinion 76, thus extending or retracting inner legs 44 and 62 in tandem.

In operation, when room 28 is in the retracted position disposed within the main living quarters, the mechanism 10 is substantially in the folded position shown in FIG. 1. As stated above, room 28 includes a moveable frame member 29, which must be kept substantially parallel to fixed rail 14 in order to ensure that room 28 extends and retracts smoothly. As room 28 is pushed outward towards the extended position away from frame 14 by cylinder 83, the mechanism 10 begins to unfold, going from the folded or retracted position shown in FIG. 1 to the extended position shown in FIGS. 2 or 3. As this unfolding occurs, the mechanism synchronizes two different movements.

Figure 5:
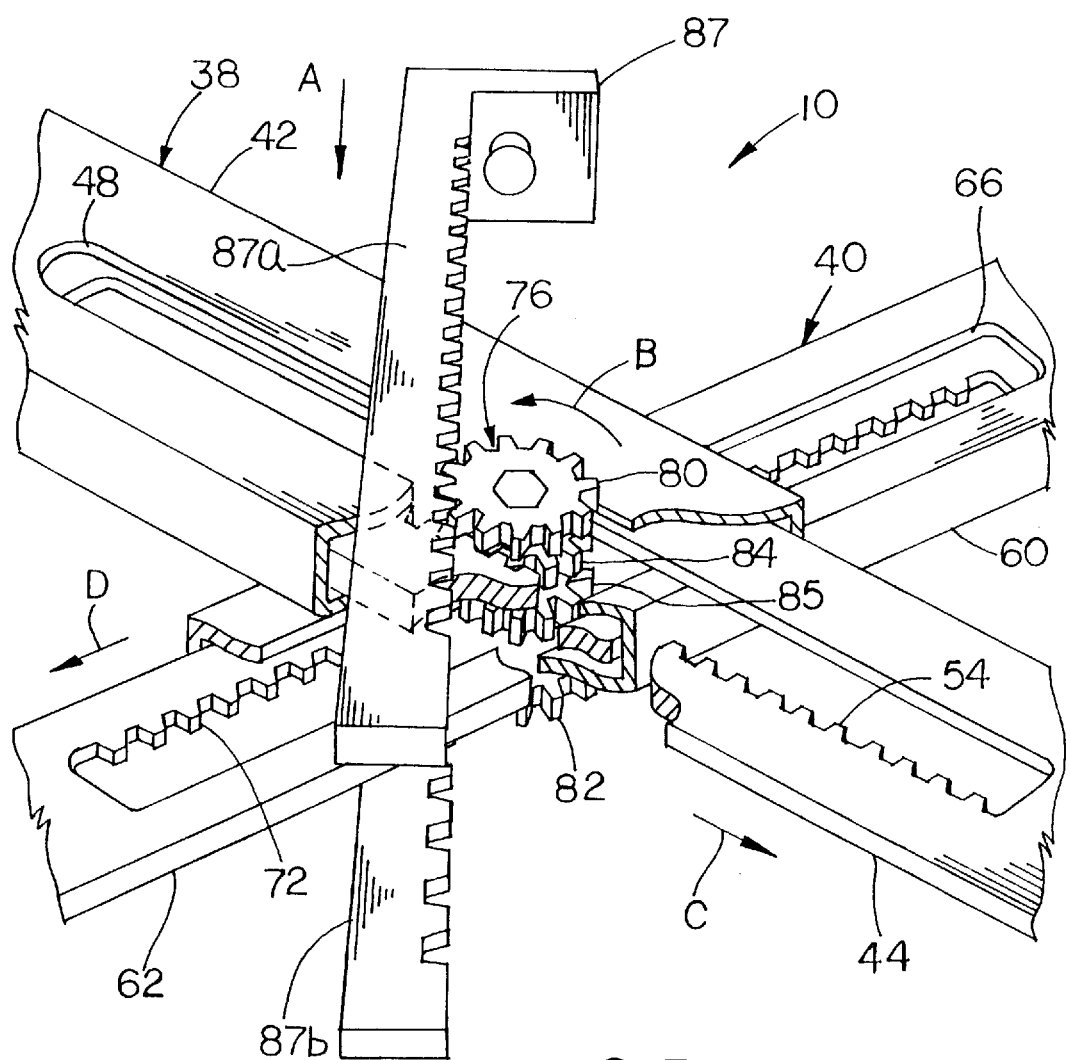
FIG. 5 is an enlarged fragmentary view in perspective of the synchronizing mechanism shown in FIGS. 3 and 4, but with portions of the inner and outer legs cut away to reveal the synchronizing pinion.
Figure 6A:
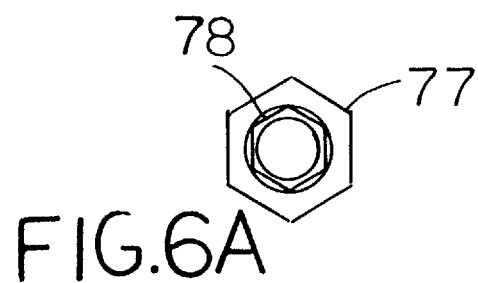
FIG. 6A is an end view of the synchronizing pinion shown in FIG. 6 shown with a threaded retention nut installed on the end of the shaft.
Figure 6:
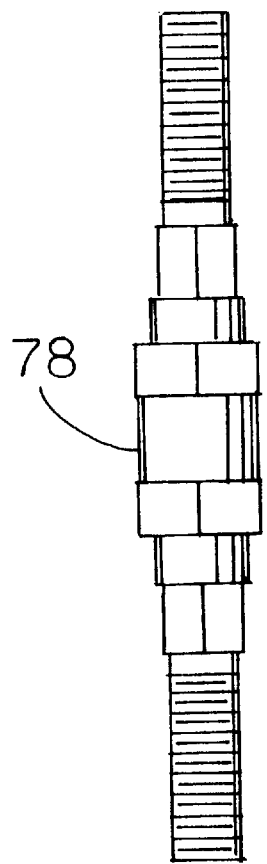
FIG. 6 is an elevational view of the synchronizing pinion shown with the gears removed.
Figure 7:
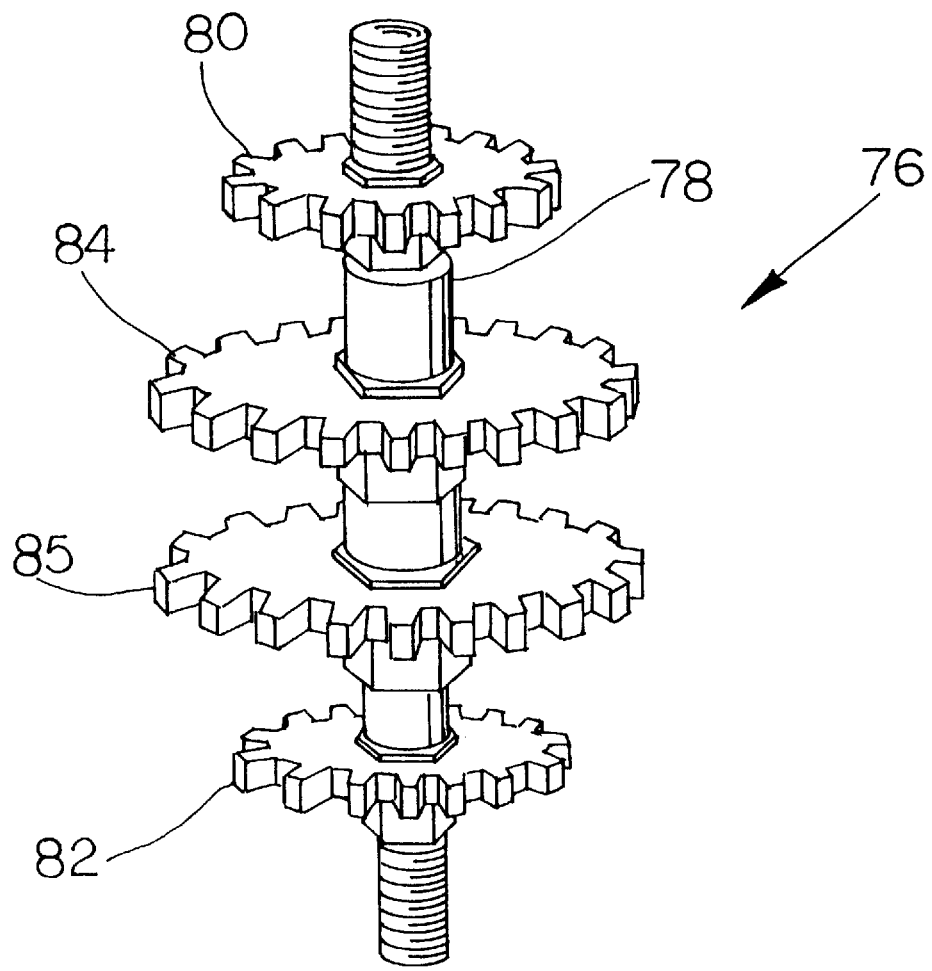
FIG. 7 is a perspective view of the synchronizing pinion shown with the gears installed.

The first synchronized movement is the extension or retraction of the inner legs 44, 62 which is controlled and synchronized by upper and lower synchro gears 84, 85 of pinion 76. Because both gears are keyed or splined to the common shaft 78, any movement of either leg 44 or 62 produces a corresponding movement in the other leg. For example, as can be seen in FIG. 5, as upper and lower drive racks 87a and 87b are forced outwardly in direction A by cylinder 83, pinion 76 rotates in direction B. Consequently upper synchro gear 84 engages rack 54 and causes inner leg 44 to extend in direction C and out of cavity 43 of out of outer leg 42. At the same time, lower synchro gear 85 engages rack 72 and causes inner leg 62 to extend in direction D and out of cavity 63 of outer leg 60. Thus, any movement of inner legs 44 and 62 is synchronized by pinion 76, so that any force that extends one extensible leg will automatically extend the other extensible leg by the same amount. As the members 38, 40 unfold, the distance between attachment points 34, 36 remains fixed by virtue of their attachment to moveable frame 29, and therefore each inner leg 44, 62 is gradually forced out of its position within the outer legs. Again, because the forces used to urge the room 28 outward are not always applied equally to both sides, the synchronization of inner legs 44, 62 eliminates binding and ensures smooth operation. The pinion 76 also synchronizes the unfolding of members 38, 40. As members 38, 40 unfold, the pinion 76 is free to move between the ends of slots 48, 50, 66 and 68 of outer members 42, 60, respectively.

By synchronizing the movement of the outer legs relative to each other, and by synchronizing the movement of the inner legs relative to each other, the mechanism 10 maintains precise alignment of moveable frame 29 relative to fixed frame 14, by keeping frame 29 parallel to frame 14, and by preventing frame 29 from moving forward or backward relative to frame 14. Also, because the distance between attachment points 34 and 36 remains fixed and relatively wide compared to conventional scissors mechanisms, the room 28 is more stable in its extended position. This stability is enhanced by the fact that each attachment point 30, 32, 34, and 36 are pin type connections rather than slots as are found in some scissors type mechanisms. Thus, mechanism 10 ensures smooth, stable, and trouble free operation of slide out room 28.

FIGS. 10 through 17 illustrate a second embodiment for the synchronizing mechanism, in which elements that are the same or substantially the same as those in the embodiment described above retain the same reference characters, but increased by 100. As shown to advantage in FIGS. 13, 14, and 15, mechanism 100 includes upper and lower longitudinally extensible members 138, 140. Upper member 138 includes substantially hollow outer leg 142 and an extensible inner leg 144 reciprocally disposed within the interior of outer leg 142. Outer leg 142 includes a lower slot 148 and an upper rack or toothed slot 150. Slots 148 and 150 include a first end 151 and a second end 153. Inner leg 144 also includes a rack or toothed slot 154, and slot 154 includes a first end 155 and second end 157. In a similar fashion, lower member 140 includes substantially hollow outer leg 160 and an inner leg 162 reciprocally disposed within the interior of outer leg 160. Outer leg 160 includes an upper slot 166 and a lower rack or toothed slot 168, which includes a first end 169 and a second end 171. Inner leg 162 also includes a toothed slot 172 having a first and second end 173, 175. Note that in the positions shown in FIGS. 13 and 15, the teeth on slots 150, 168 on outer legs 142, 160, respectively, are oriented in different directions, as are the teeth of slots 154 and 172 of inner members 144 and 162, respectively.

Synchronizing pinion 176 includes shaft 178, upper and lower gears 180, 182, and inner gear 184. Upper and lower gears 180, 182 are welded, keyed, bolted, splined, or otherwise suitably attached to upper and lower ends, respectively, of shaft 178 so that both gears rotate in tandem in conjunction with any rotation of the shaft 178. Inner gear 184 is disposed on shaft 178 between upper and lower gears 180, 182, and is free to rotate about shaft 178 independently of any rotation of shaft 178, upper gear 180, and lower gear 182. Pinion 176 is disposed so that shaft 178 extends through slots 150, 154, 148, 166, 172, and 168, respectively, such that upper gear 180 meshes with the teeth of slot 150 of outer leg 142 and lower gear 182 meshes with slot 168 of outer leg 160. Also, inner gear 184 meshes with both slot 154 and slot 172 of upper and lower inner legs 144, 162, respectively. Pinion 176 is secured in place by a pair of end caps 186, 188 which maintain the precise alignment of pinion 176 substantially perpendicular to upper and lower members 138, 140. Each cap includes a protruding portion 190 sized to fit in slots 150 and 168 so as to not catch on the teeth so that the ends caps will slide smoothly along the slots. Each end cap 186, 188 also includes a circular depression or counterbore 189, which partially encloses and aligns gears 180, 182, thereby allowing a portion of each gear to mesh with its adjacent slot as the caps slide back and forth along the slots in conjunction with pinion 176 as is discussed in greater detail below. End caps 186, 188 are preferably secured to the ends of shaft 178 by screws, bolts, retention clips, or other suitable means (not shown).

In operation, when room 28 is in the retracted position disposed within the main living quarters, the mechanism 110 is substantially in the folded position shown in FIG. 11. As stated above, room 28 includes a moveable frame member 129, which must be kept substantially parallel to fixed rail 114 in order to ensure that room 28 extends and retracts smoothly. As room 28 is pushed, pulled, or otherwise shifted outward to the extended position, the mechanism 110 begins to unfold, going from the folded or retracted position shown in FIG. 10 to the extended position shown in FIG. 11, to the fully extended or unfolded position shown in FIG. 12. As this unfolding occurs, the mechanism synchronizes two different movements.

The first synchronized movement is the unfolding movement of outer legs 144 and 160, which is controlled and synchronized by upper and lower gears 180, 182 of pinion 76. Because these two gears arc keyed or splined to the common shaft 78, as either leg 44 or 60 is moved, the upper and lower gears 80, 82 mesh with their adjacent slot, which produces a corresponding movement of the other outer leg so that the outer legs unfold in precise coordination with each other. As outer legs 44, 60 unfold, the pinion 76 rotates, and thus translates along the slots as gears 80 and 82 mesh with slots 50 and 68, respectively, from a position near the first end to a position near the second end of the slots.

At the same time, the pinion 76 synchronizes a second movement. The movement of inner legs 44 and 62 is synchronized by inner gear 84 of pinion 76, and any force that extends one extensible leg will automatically extend the other extensible leg by the same amount by action of inner gear 84 on slots 54 and 72. As the members 38, 40 unfold, the distance between attachment points 34, 36 remains fixed by virtue of their attachment to moveable frame 29, and therefore each inner leg 44, 62 is gradually drawn or pulled out of its position within the outer legs. Again, because the forces used to urge the room 28 outward are not always applied equally to both sides, the synchronization of inner legs 44, 62 eliminates binding and ensures smooth operation.

Also, as stated above, inner gear 84 is free to rotate independently of shaft 76 and gears 80, 82. This independent rotation thus permits inner legs 44, 62 to be extended independently of any movement of outer legs 42, 60 such as during assembly or adjustment. By synchronizing the movement of the outer legs relative to each other, and by synchronizing the movement of the inner legs relative to each other, the mechanism 110 maintains precise alignment of moveable frame 129 relative to fixed frame 114, by keeping frame 129 parallel to frame 114, and by preventing frame 129 from moving forward or backward relative to frame 114. Also, because the distance between attachment points 134 and 136 remains fixed and relatively wide compared to conventional scissors mechanisms, the room 128 is more stable in its extended position. This stability is enhanced by the fact that each attachment point 130, 132, 134, and 136 are pin type connections rather than slots as are found in some scissors type mechanisms. Thus, mechanism 10 ensures smooth, stable, and trouble free operation of slide out room 128.

Figure 18:
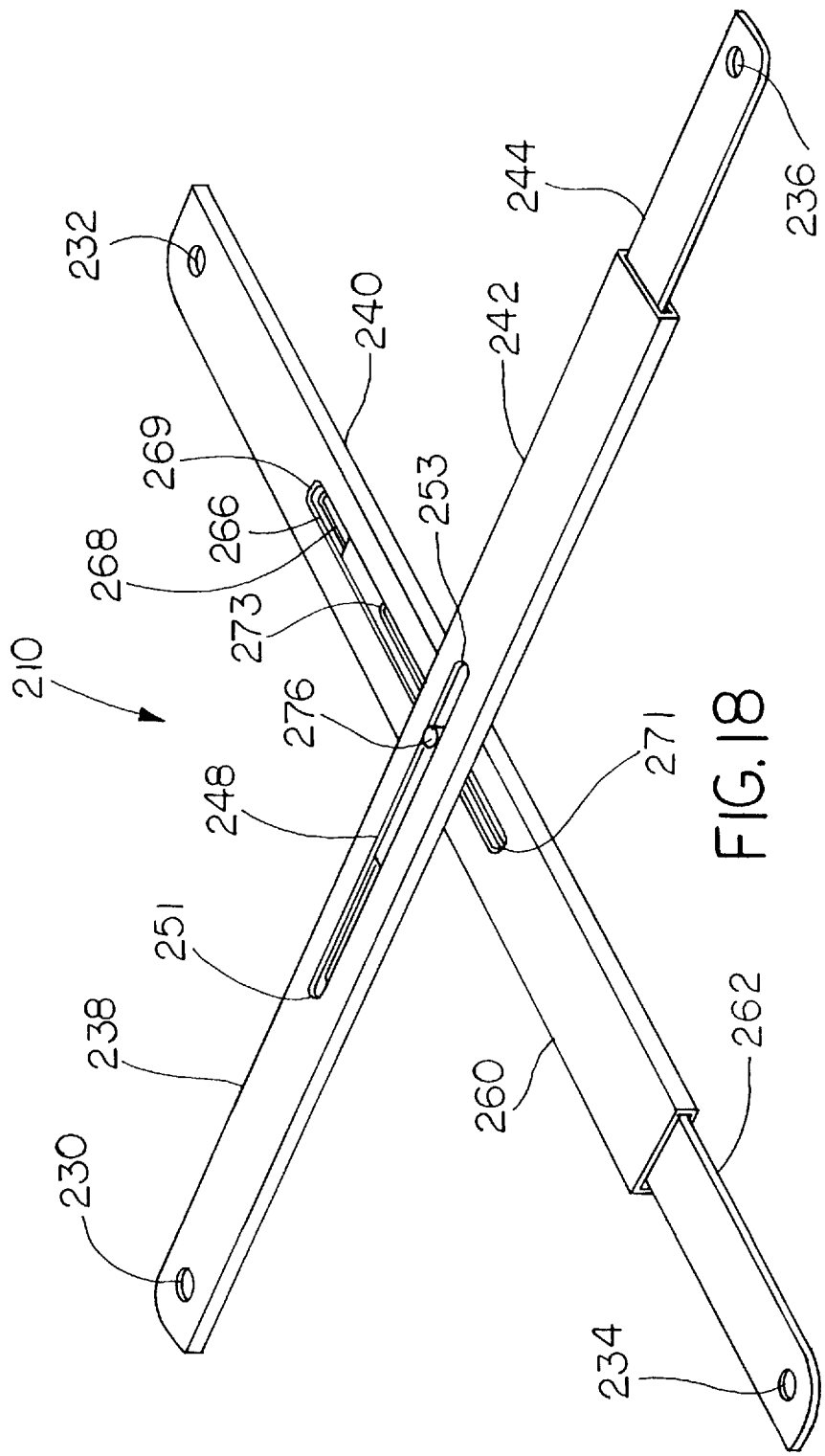
FIG. 18 is a perspective view of a third embodiment of the present invention.
Figure 19:
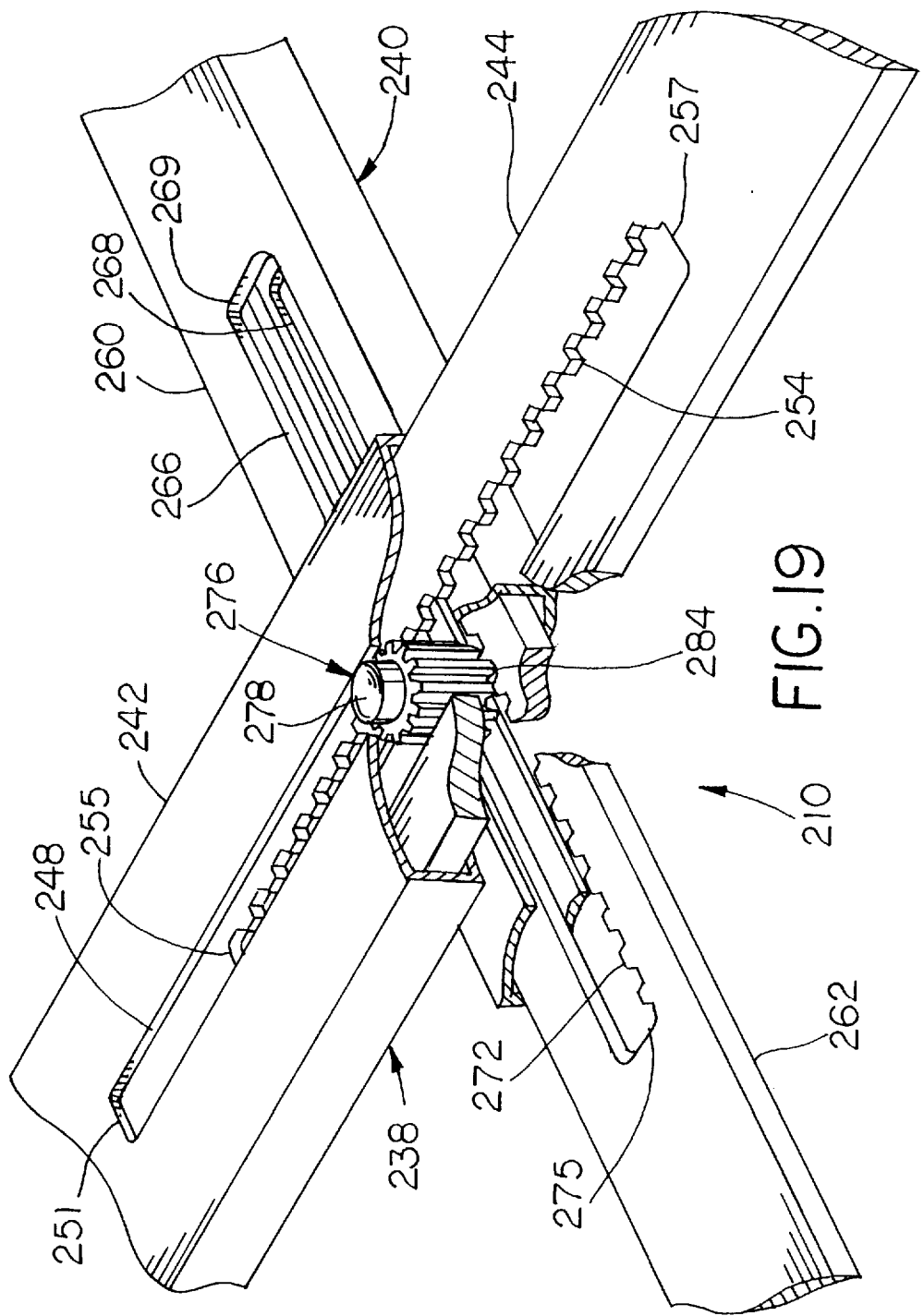
FIG. 19 is an enlarged view in perspective of the embodiment shown in FIG. 18, with portions of the members cut away to reveal the synchronizing pinion.
Figure 20:
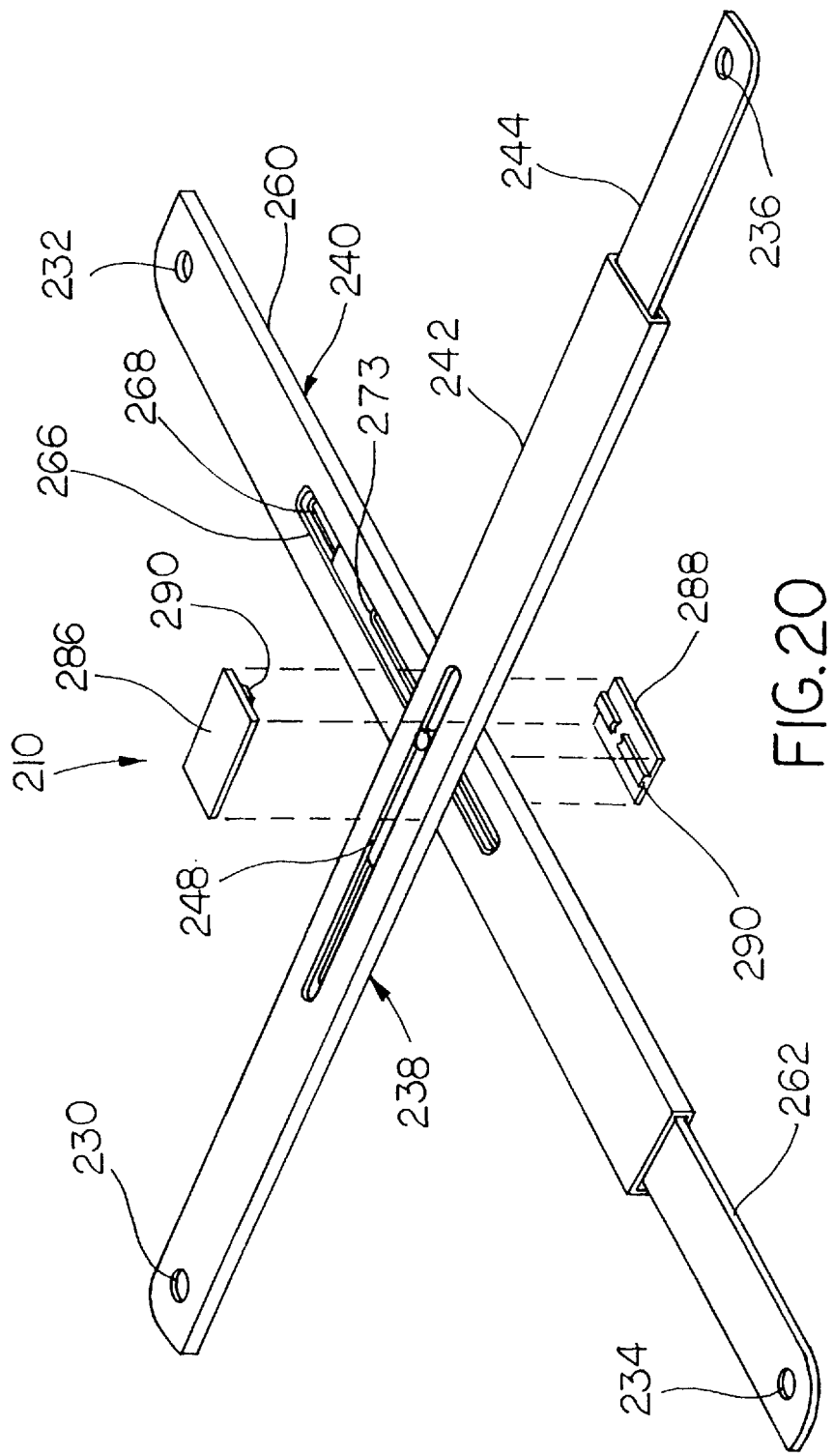
FIG. 20 is a perspective view, partly exploded, of the embodiment shown in FIGS. 18 and 19.

FIGS. 18 through 20 show a third embodiment of the invention, in which the same or similar parts are given the same reference numeral as those in the first embodiment, but increased by 200. Mechanism 210 includes upper member 238 and lower member 240, and is attached to a fixed frame and a moveable frame similar to that shown in FIGS. 1 and 3 (not shown). Mechanism 210 is shiftable between a folded position and an unfolded position. Mechanism 210 includes attachment points 230, 232, 234, and 236, which are attached to a fixed frame and a moveable frame by mounting brackets (not shown). Attachment points 230, 232, 234, and 236 are pin type connections, and hence the ends of members 238 and 240 are free to pivot about a vertical axis as the moveable frame is moved toward or away from the fixed frame.

Member 238 includes substantially hollow outer leg 242 and an inner leg 244 reciprocally disposed within the interior of outer leg 242. Outer leg 242 includes upper and lower slots 248, 250, having a first end 251 and a second end 253. Inner leg 244 includes a toothed slot 254, having a first end 255 and second end 257. In a similar fashion, lower member 240 includes substantially hollow outer leg 260 and an inner leg 262 reciprocally disposed within the interior of outer leg 260. Outer leg 260 includes upper and lower slots 266, 268 having a first end 269 and a second end 271. Inner leg 262 also includes a toothed slot 272 having a first end 273 and a second end 275. Slot 250 is wider than slot 248, and slot 266 is wider than slot 268 in order to accommodate gear 284 such that gear 284 can rotate and move back and forth within the smooth slots 250 and 266. Note that in the position shown in FIG. 19, the teeth on slots 254 and 272 are oriented in different directions.

As shown in FIG. 19, synchronizing pinion 276 includes shaft 278 and gear 284, which is free to rotate about shaft 278. Pinion 276 is disposed so that shaft 278 extends through slots 248, 254, 250, 266, 272, and 268, respectively. Gear 284 meshes with slot 254 and slot 272 of inner legs 244, 262, respectively. Pinion 276 is secured in place by a pair of end caps 286, 288 which maintain the precise alignment of pinion 276 substantially perpendicular to upper and lower members 238, 240. Each cap includes a protruding portion 290 sized to fit in slots 248 and 268, respectively, so that the ends caps will slide smoothly along the slots. End caps 286, 288 are preferably secured to the ends of shaft 278 by screws, bolts, retention clips, or other suitable means.

In operation, as members 238 and 240 of mechanism 210 are unfolded, gear 284 meshes with slots 254, 272 of inner legs 244, 262, respectively, so that inner legs 244 and 262 are gradually drawn out of the outer legs at the same rate.

The ends of shaft 278 of pinion 276 slide along slots 248 and 268, guided by end caps 286, 288, respectively, which coordinates the movement of outer legs 242 and 260 with each other. Accordingly, the movement of the outer legs can be synchronized until legs 238 and 240 are substantially perpendicular to each other.

What is claimed:

1. On a recreational vehicle having a fixed frame and a moveable frame moveable relative to the fixed frame, the moveable frame supporting a slide out room enclosing expandable living quarters, an apparatus for keeping the moveable frame aligned with and parallel to the fixed frame when the moveable frame is moved towards or away from the fixed frame, comprising:

a pair of elongated extensible members, each of said members including an inner end pivotally mounted to the fixed frame and an outer end pivotally mounted to the moveable frame, said members being shiftable between a folded position and an unfolded position;

a synchronizing device interconnecting said extensible members for maintaining the rate of extension of one of said members equal to the rate of extension of the other of said members as the moveable frame moves relative to the fixed frame.

2. The device of claim 1, wherein each of said extensible members includes a base leg and a moveable leg telescopically mounted to said base leg, one end of said base legs forming said extensible member inner ends and one end of said moveable legs forming said extensible member outer ends, each of said moveable legs being shiftable between a retracted position generally adjacent their corresponding base leg and an extended position generally extended from their corresponding base leg, thereby permitting said extensible members to lengthen as the moveable frame is moved away from the fixed frame and thereby permitting said extensible members to shorten as the moveable frame is moved towards the fixed frame.

3. The device of claim 2, wherein each of said base legs includes a top surface, a bottom surface and a pair of interconnecting side surfaces defining an elongated cavity therein, said moveable legs being generally disposed within said cavity when said moveable legs are in said retracted position and further being generally extended from said cavity when said moveable legs are in said extended position.

4. The device of claim 3, wherein each of said base legs include a slot in each of said top and bottom surfaces, and each of said moveable legs include a slot, said synchronizing device being disposed within said slots.

5. The device of claim 4, wherein said synchronizing device includes a rotatable shaft, said shaft being disposed within said slots.

6. The device of claim 5, including a hydraulic cylinder for moving the moveable frame, said cylinder having a first end mounted to the fixed frame and having a second end drivingly connected to the moveable frame.

7. The device of claim 6, wherein said cylinder second end engages said shaft.

8. The device of claim 6, wherein said synchronizing device includes a drive gear rigidly mounted to said shaft, and wherein said cylinder second end includes a drive rack in engagement with said drive gear for rotating said drive gear and said synchro gears, so that any movement of said cylinder second end towards or way from the fixed frame rotates said drive gear and said sycnhro gears, thereby retracting or extending the moveable legs, respectively.

9. The device of claim 4, wherein each of said moveable leg slots includes a elongated rack, and wherein said synchronizing device includes a rotatable shaft having a first synchronizing gear and a second synchronizing gear mounted to said shaft, said first synchronizing gear engaging one of said moveable leg racks and said second synchronizing gear engaging the other of said moveable leg racks, so that any movement of one of said moveable legs relative to its corresponding base leg causes said first and second snchronizing gears and said shaft to rotate thereby moving said other moveable leg and equal distance relative to its corresponding base leg.

10. The device of claim 6, wherein said shaft includes an upper and lower drive gear, and wherein said cylinder second end includes an upper and lower drive rack in engagement with said upper and lower drive gears, respectively, for rotating said drive gears and said first and second synchronizing gears, so that any movement of said cylinder second end towards or way from the fixed frame rotates said drive gears and said first and second synchronizing gears, thereby retracting or extending the moveable legs, respectively.

11. The device of claim 4, wherein each of said moveable leg slots includes an elongated rack and wherein one of said slots in each of said base legs includes an elongated rack, and wherein said synchronizing device includes a rotatable shaft having first and second base leg gears rigidly mounted to said shaft, one of said base leg gears engaging one of said base leg racks and the other of said base leg gears engaging the other of said base leg racks, said synchronizing device further including a synchronizing gear rotatably mounted to said shaft and engaging each of said movable leg racks, so that any movement of one of said base legs towards or away from the fixed frame causes the other of said base legs to move towards or away from the fixed frame an equal amount, and further so that any movement of one of said movable legs relative to its corresponding base leg causes said synchronizing gear to rotate relative to said shaft thereby moving said other movable leg an equal distance relative to its corresponding base leg.

12. The device of claim 4, wherein each of said movable leg slots includes an elongated rack, and wherein said synchronizing device includes a rotatable shaft having a synchronizing gear mounted to said shaft, said synchronizing gear engaging each of said movable leg racks, so that movement of any one of said movable legs relative to its corresponding base leg causes said synchronizing gear to rotate thereby moving said other movable leg an equal distance relative to its corresponding base leg.

13. The device of claim 12, wherein said synchronizing gear is rigidly mounted to said shaft.

14. The device of claim 12, wherein said synchronizing gear is rotatably mounted to said shaft.

15. The device of claim 4, including an upper and lower retaining cap mounted to said synchronizing device for holding said device substantially perpendicular to said base leg top and bottom surfaces.

16. On a recreational vehicle having a fixed frame and a moveable frame moveable relative to the fixed frame, the moveable frame supporting a slide out room enclosing expandable living quarters, an apparatus for keeping the moveable frame aligned with and parallel to the fixed frame when the moveable frame is moved towards or away from the fixed frame, comprising:

a pair of elongated extensible members, each of said members including an inner end pivotally mounted to the fixed frame and an outer end pivotally mounted to the moveable frame, said members being shiftable between a folded position and an unfolded position;

a synchronizing pinion interconnecting said extensible members for maintaining the rate of extension of one of said members equal to the rate of extension of the other of said members as the moveable frame moves relative to the fixed frame.

17. The device of claim 16, wherein each of said extensible members includes a base leg and a moveable leg telescopically mounted to said base leg, one end of said base legs forming said extensible member inner ends and one end of said moveable legs forming said extensible member outer ends, each of said moveable legs being shiftable between a retracted position generally adjacent their corresponding base leg and an extended position generally extended from their corresponding base leg, thereby permitting said extensible members to lengthen as the moveable frame is moved away from the fixed frame and thereby permitting said extensible members to shorten as the moveable frame is moved towards the fixed frame.

18. The device of claim 17, wherein each of said base legs includes a top surface, a bottom surface and a pair of interconnecting side surfaces defining an elongated cavity therein, said moveable legs being generally disposed within said cavity when said moveable legs are in said retracted position and further being generally extended from said cavity when said moveable legs are in said extended position.

19. The device of claim 18, wherein each of said base legs include a slot in each of said top and bottom surfaces, and each of said moveable legs include a slot, said synchronizing pinion being disposed within said slots.

20. The device of claim 19, wherein said synchronizing pinion includes a rotatable shaft, said shaft being disposed within said slots.

21. The device of claim 19, wherein each of said moveable leg slots includes an elongated rack, and wherein said synchronizing pinion includes a rotatable shaft having a first synchronizing gear and a second synchronizing gear mounted to said shaft, said first synchronizing gear engaging one of said moveable leg racks and said second synchronizing gear engaging the other of said moveable leg racks, so that any movement of one of said moveable legs relative to its corresponding base leg causes said synchronizing gears and said shaft to rotate thereby moving said other moveable leg an equal distance relative to its corresponding base leg.

22. The device of claim 20, including a hydraulic cylinder for moving the moveable frame, said cylinder having a first end mounted to the fixed frame and having a second end drivingly connected to the moveable frame.

23. The device of claim 22, wherein said cylinder second end engages said shaft.

24. The device of claim 21 wherein said synchronizing pinion includes a drive gear rigidly mounted to said shaft, and wherein said cylinder second end includes a drive rack in engagement with said drive gear for rotating said drive gear and said first and second synchronizing gears, so that any movement of said cylinder second end towards or way from the fixed frame rotates said drive gear and said first and second synchronizing gears, thereby retracting or extending the moveable legs, respectively.

25. The device of claim 21 wherein said synchronizing pinion includes a drive gear rigidly mounted to said shaft, and wherein said cylinder second end includes a drive rack in engagement with said drive gear for rotating said drive gear and said first and second synchronizing gears, so that any movement of said cylinder second end towards or way from the fixed frame rotates said drive gears and said first and second synchronizing gears, thereby retracting or extending the moveable legs, respectively.

26. The device of claim 19, wherein each of said moveable leg slots includes an elongated rack and wherein one of said slots in each of said base legs includes an elongated rack, and wherein said synchronizing pinion includes a rotatable shaft having first and second leg gears rigidly mounted to said shaft, one of said base leg gears engaging one of said base leg racks and the other of said base leg gears engaging the other of said base leg racks, said synchronizing pinion further including a synchronizing gear rotatably mounted to said shaft and engaging each of said movable leg racks, so that any movement of one of said base legs towards or away from the fixed frame causes the other of said base legs to move towards or away from the fixed frame an equal amount, and further so that any movement of one of said movable legs relative to its corresponding base leg causes said synchronizing gear to rotate relative to said shaft thereby moving said other movable leg an equal distance relative to its corresponding base leg.

27. The device of claim 19, wherein each of said movable leg slots includes an elongated rack, and wherein said synchronizing pinion includes a rotatable shaft having a synchronizing gear mounted to said shaft, said synchronizing gear engaging each of said movable leg racks, so that movement of any one of said movable legs relative to its corresponding base leg causes said synchronizing gear to rotate thereby moving said other movable leg an equal distance relative to its corresponding base leg.

28. The device of claim 27, wherein said synchronizing gear is rigidly mounted to said shaft.

29. The device of claim 27, wherein said synchronizing gear is rotatably mounted to said shaft.

30. The device of claim 19, including an upper and lower retaining cap mounted to said synchronizing pinion for holding said device substantially perpendicular to said base leg top and bottom surfaces.

* * * * *